United States Patent
Nakahara et al.

(10) Patent No.: US 12,086,582 B2
(45) Date of Patent: Sep. 10, 2024

(54) VEHICLE CONTROLLER, UPDATED PROGRAM, PROGRAM UPDATING SYSTEM, AND WRITING DEVICE

(71) Applicant: HITACHI ASTEMO, LTD., Hitachinaka (JP)

(72) Inventors: Fumiharu Nakahara, Ibaraki (JP); Yusuke Abe, Ibaraki (JP); Yusuke Kogure, Ibaraki (JP)

(73) Assignee: Hitachi Astemo, Ltd., Ibaraki (JP)

( * ) Notice: Subject to any disclaimer, the term of this patent is extended or adjusted under 35 U.S.C. 154(b) by 319 days.

(21) Appl. No.: 17/628,506

(22) PCT Filed: Jul. 21, 2020

(86) PCT No.: PCT/JP2020/028222
§ 371 (c)(1),
(2) Date: Jan. 19, 2022

(87) PCT Pub. No.: WO2021/024792
PCT Pub. Date: Feb. 11, 2021

(65) Prior Publication Data
US 2022/0276851 A1    Sep. 1, 2022

(30) Foreign Application Priority Data

Aug. 5, 2019  (JP) ................. 2019-143655

(51) Int. Cl.
*G06F 9/44* (2018.01)
*G06F 8/65* (2018.01)
(Continued)

(52) U.S. Cl.
CPC ............... *G06F 8/65* (2013.01); *G07C 5/008* (2013.01); *G07C 5/085* (2013.01)

(58) Field of Classification Search
None
See application file for complete search history.

(56) References Cited

U.S. PATENT DOCUMENTS

| 5,764,992 A | 6/1998 | Kullick |
| 2002/0038409 A1 | 3/2002 | Hirano |

(Continued)

FOREIGN PATENT DOCUMENTS

| JP | 2002-099442 A | 4/2002 |
| JP | 2006-243997 A | 9/2006 |

(Continued)

OTHER PUBLICATIONS

International Search Report with English translation and Written Opinion issued in corresponding application No. PCT/JP2020/028222 dated Nov. 17, 2020.

*Primary Examiner* — Insun Kang
(74) *Attorney, Agent, or Firm* — Foley & Lardner LLP

(57) ABSTRACT

A vehicle controller with improved usability related to updating of a control program is provided. The vehicle controller is capable of updating a stored control program, based on update contents provided by a writing device. The control program includes a control code, and control data that is referred to when the control code is executed. The vehicle controller includes a nonvolatile memory that allows a first memory area and a second memory area to be switched and used alternately, the first memory area and the second memory area each storing both the control code and the control data, and an updating request determining unit that determines whether an updating request from the writing device requests updating of both the control code and the control data or requests updating of the control data only. When determining that updating of the control data only is requested, the updating request determining unit writes received control data to any given memory area in which a currently active control program is stored.

11 Claims, 14 Drawing Sheets

(51) Int. Cl.
*G07C 5/00* (2006.01)
*G07C 5/08* (2006.01)

(56) References Cited

U.S. PATENT DOCUMENTS

| | | |
|---|---|---|
| 2006/0259207 A1 | 11/2006 | Natsume |
| 2007/0212016 A1 | 9/2007 | Kurisu |
| 2012/0254865 A1 | 10/2012 | Saeki |
| 2019/0265967 A1* | 8/2019 | Nakahara .................. G06F 8/65 |
| 2020/0233654 A1* | 7/2020 | Matsumoto ............... G06F 8/65 |
| 2021/0155252 A1* | 5/2021 | Harata ...................... G06F 8/65 |
| 2022/0036670 A1* | 2/2022 | Kobayashi ................ G06F 8/71 |

FOREIGN PATENT DOCUMENTS

| | | |
|---|---|---|
| JP | 2006-301960 A | 11/2006 |
| JP | 2007-230317 A | 9/2007 |
| JP | 2010-198307 A | 9/2010 |
| JP | 2012-220990 A | 11/2012 |

\* cited by examiner

VEHICLE CONTROLLER, UPDATED PROGRAM, PROGRAM UPDATING SYSTEM, AND WRITING DEVICE

TECHNICAL FIELD

The present invention relates to a vehicle controller.

BACKGROUND ART

A vehicle controller includes an arithmetic processing unit (e.g., a microcomputer) and a storage device, such as a flash read only memory (ROM), that stores a control program. It has been a common practice that a vehicle is brought to a car dealer shop, where a maintenance expert connects a program writing device to the vehicle and updates a control program. However, as so-called "connected vehicles", which are vehicles constantly connected to the Internet, become widespread, data updating through a wireless means is expected to become common practice in which not only adding functions to a car navigation system and updating map data but also updating a control program of a vehicle are carried out by wireless setups.

If program updating fails because of an unknown accident (communication breakdown, problem with hardware, or the like) happened during a program writing process, however, a new version of software and an old version of software would become unusable or dysfunctional. It is assumed, in the worst case, that the vehicle might become inoperable.

As background art in the present technical field, the following prior art has been known. Patent Literature 1 (Japanese Patent Application Laid-Open No. 2006-301960) discloses a control unit for automobiles, the control unit including: a nonvolatile memory that stores control software for managing a process of controlling an electronic device incorporated in an automobile, the nonvolatile memory having storage contents electrically rewritable and retaining the storage contents even when receiving an external reset signal; a RAM serving as a memory where the control software is executed; and a CPU that based on execution of the control software, carries out the process of controlling the electronic device. In this control unit, the nonvolatile memory includes: a main storage area for storing a current version program that is a currently used version program of the control software; and a sub-storage area for storing an updated version program including a point of updating from the current version program, and further includes a program rewriting means that executes a program storage process of storing the updated version program obtained from the outside in the sub-storage area and a program rewriting process including a memory switching process by which when writing the updated version program to the sub-storage area is successful, the sub-storage area in which the updated version program has been stored is used as a new main storage area in replacement of a memory area currently used as the main storage area, and when data writing to the sub-storage area ends up in a failure, in contrast, the replacement is not carried out.

CITATION LIST

Patent Literature

PTL 1: Japanese Patent Application Laid-Open No. 2006-301960

SUMMARY OF INVENTION

Technical Problem

According to the above control unit for vehicles described in Patent Literature 1, the main storage area, in which a current version of a control program is stored, and the sub-storage area, in which an updated version of the same is stored, are provided in a flash ROM, and these areas are used alternately at the time of program updating. Even if writing an updated version program ends up in a failure, therefore, an old version program can be used as usual (two-sided ROM updating).

Generally, the control program of the vehicle controller includes a control code for executing processes (the command code of the control program) and various data used for control (which will hereinafter be referred to as control data), such as a data map and characteristic data that are referred to at execution of control, and these code and data are often stored in a rewritable nonvolatile storage device.

Updating the control program of such a configuration involves a requirement that part of control data, which is referred to when the control code is executed, be change as the control code is kept in the same state (the same version). This requirement arises because of an idea of skipping unnecessary updating processes to reduce a control program updating time.

In such a case, a method may be adopted by which the control code and the control data are separately placed in different physical blocks of the flash ROM, and only the control data is specified and updated while the control code, which does not need to be changed, is not updated.

However, according to the control unit for automobiles described in Patent Literature 1, because the control program is updated by alternately using the main storage area and the sub-storage area, an old version of the control program, which is older than the currently running control program by one version, is stored in an updating target storage area. In this case, therefore, updating the control data only, as mentioned above, is impossible, and a pair of the control code and the control data need to be updated simultaneously. This leads to a longer control program updating time, thus making the control unit inferior in usability.

The present invention has been conceived in view of the above problems, and it is therefore an object of the present invention to provide a vehicle controller with a means for safely updating a control program in a short time, the vehicle controller storing a plurality of control programs each including control code and control data in a nonvolatile memory, and improve usability of the vehicle controller, the usability being related to updating of the control program.

Solution to Problem

A typical example of the present invention disclosed herein is as follows. A vehicle controller capable of updating a stored control program based on update contents provided by a writing device is provided. The control program includes a control code, and control data that is referred to when the control code is executed. The vehicle controller includes: a nonvolatile memory that allows a first memory area and a second memory area to be switched and used alternately, the first memory area and the second memory area each storing both the control code and the control data; and an updating request determining unit that determines whether an updating request from the writing device requests updating of both the control code and the control data or requests updating of the control data only. When determining that updating of the control data only is requested, the updating request determining unit writes received control data to any given memory area in which a currently active control program is stored.

Advantageous Effects of Invention

According to the present invention, the control program can be safely updated in a short time. Problems, configurations, and effects other than those described above will be made clear by the following description of embodiments.

DESCRIPTION OF EMBODIMENTS

First Embodiment

Figure 1:
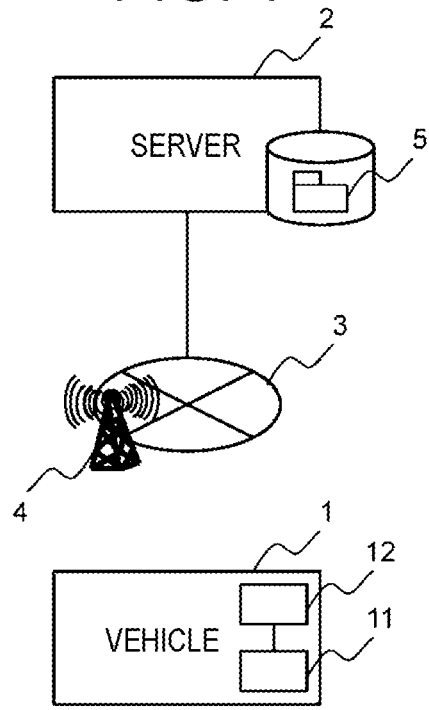
FIG. 1 is a configuration diagram of a program updating system according to a first embodiment.

A program updating system according to an embodiment of the present invention will hereinafter be described with reference to the drawings.
FIG. 1 is a configuration diagram of a program updating system according to a first embodiment of the present invention. The program updating system of the first embodiment includes a vehicle 1, a server 2, an Internet line 3, and a radio base station 4. The vehicle 1 is connected to the server 2 by wireless communication through network elements, such as the Internet line 3 and the radio base station 4, thus communicating with the server 2. As wireless communication networks, for example, a public mobile phone network, such as 3G and LTE, or a WiFi network can be used. The server 2 delivers an update package 5 to the vehicle 1, the update package 5 being necessary for updating a control program of a vehicle controller 11 the vehicle 1 has. The vehicle controller 11 of the vehicle 1 rewrites the control program, using the update package 5.

Figure 2:
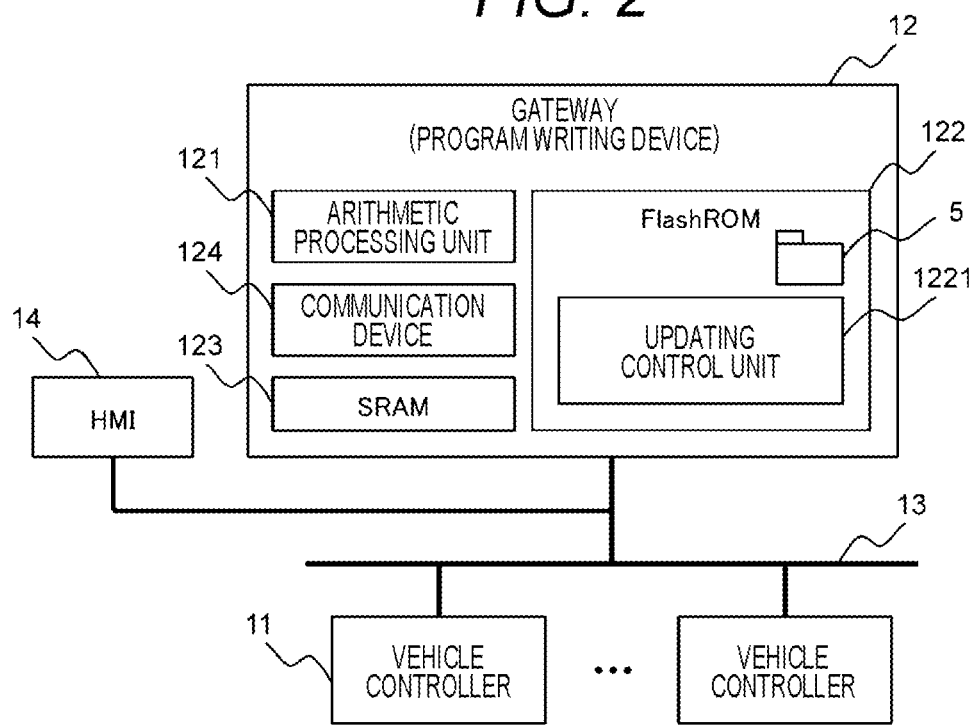
FIG. 2 is a configuration diagram of an in-vehicle network system a vehicle has.

FIG. 2 is a configuration diagram of an in-vehicle network system the vehicle 1 has. The vehicle controller 11 is a device that executes a control program for controlling the operation of the vehicle 1, and is connected to a gateway (program writing device) via an in-vehicle network 13 (e.g., a controller area network (CAN)). The vehicle controller 11 can communicate with another vehicle controller 11 via the gateway 12.

The gateway 12 serves also as a program writing device that controls updating of the control program for the vehicle controller 11. The gateway 12 receives the update package 5 from the server 2, and transmits a control program updating command (reprogramming command) and an updating control program itself, to the vehicle controller 11. The program writing device may be provided as a separate device independent of the gateway 12.

The gateway 12 includes an arithmetic processing unit 121, a flash read only memory (ROM) 122, a static random access memory (SRAM) 123, and a communication device 124 including a CAN transceiver and a wireless communication module. The arithmetic processing unit 121 executes a program stored in the flash ROM 122 to communicate with the vehicle controller 11 on the in-vehicle network 13 and with the server 2.

A control program of the vehicle controller 11 is updated in such a way that the gateway 12 receives the update package 5 from the server 2 and stores it temporarily in the flash ROM 122 and then an updating control unit 1221 updates the control program of the vehicle controller 11, using the update package 5.

A human-machine interface (HMI) 14 is made up of, for example, various liquid crystal display devices embedded in the center of the dashboard of the vehicle 1, operation switches arranged close to the display devices, an in-vehicle speaker, and the like. The HMI 14 displays various pieces of information to an occupant of the vehicle 1 and processes various input operations. In addition, the HMI 14 makes display related to updating of a control program of the vehicle controller 11 and receives an operation input.

Figure 3:
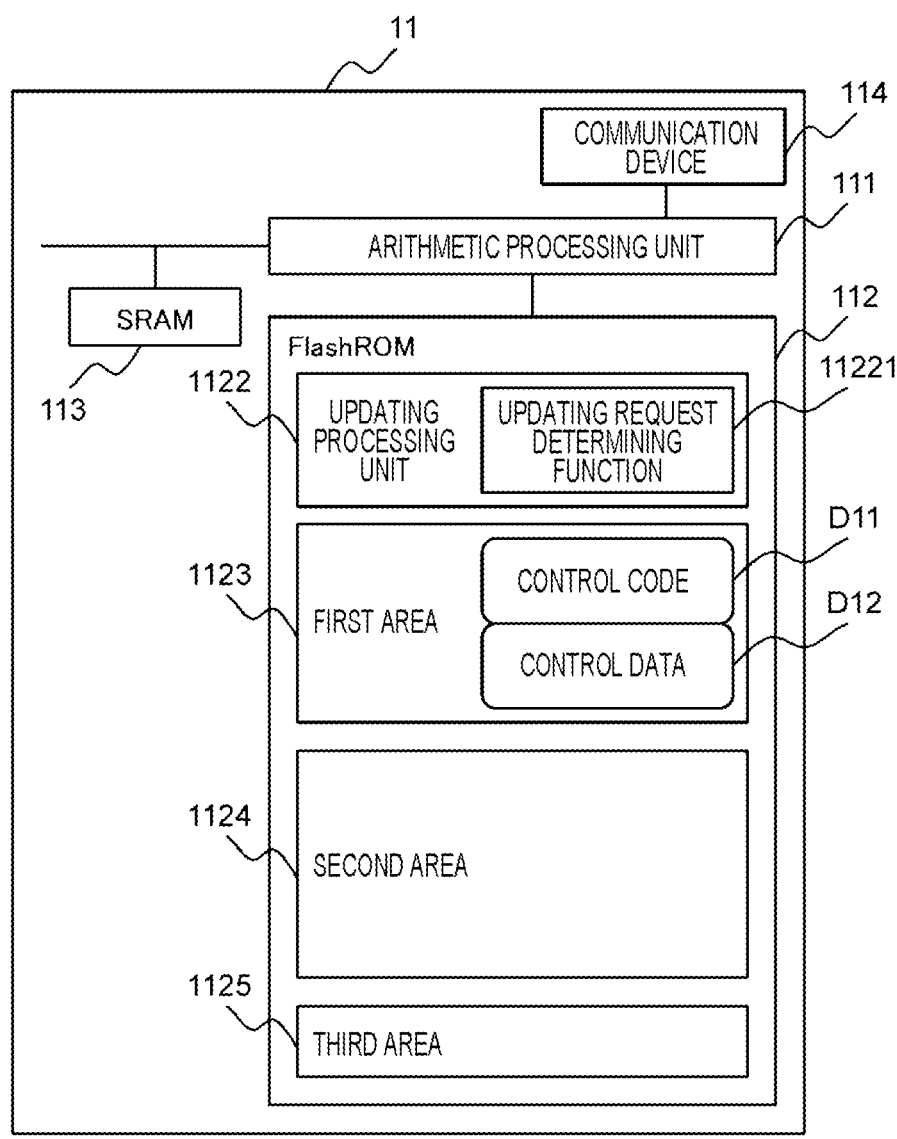
FIG. 3 is a configuration diagram of a vehicle controller.

FIG. 3 is a configuration diagram of the vehicle controller 11. The vehicle controller 11 includes an arithmetic processing unit 111, a flash ROM 112, a SRAM 113, and a communication device 114 (e.g., a CAN transceiver).

The arithmetic processing unit 111 is an arithmetic processing unit, such as a microcomputer, that executes a control program stored in the flash ROM 112. In the following description, for convenience, each program is described as an operation subject in some cases. It should be noted, however, that the arithmetic processing unit 111 is actually responsible for executing the program.

The flash ROM 112 is a rewritable nonvolatile memory, and has an updating processing unit 1122, a first area 1123 serving as a first storage area, a second area 1124 serving as a second storage area, and a third area serving as a third storage area. A configuration of the flash ROM 112 will hereinafter be described with reference to FIG. 4.

Figure 4:
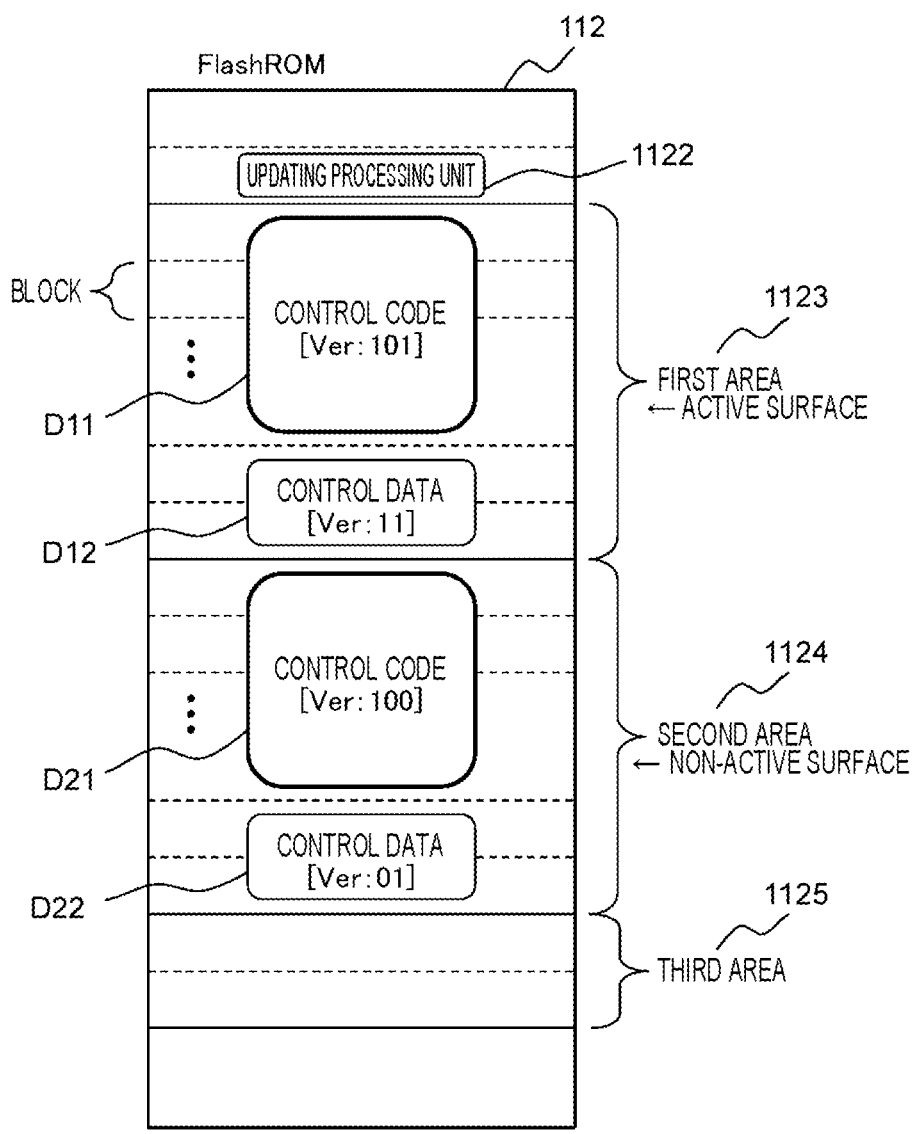
FIG. 4 depicts an internal configuration of a flash ROM.

FIG. 4 depicts an internal configuration of the flash ROM 112. The flash ROM 112 is composed of a plurality of physical blocks, and includes the first area 1123 and the second area 1124 which each store a control program, and the third area which is used as a work area when the control program is updated. "Block" mentioned here is a unit of deleting and rewriting data in the flash ROM 112. The control program is composed of control codes D 11 and D 21, which are program bodies to be executed, and control data D 12 and D 22, which are referred to when program control is carried out.

The flash ROM 112 further includes the updating processing unit 1122 that communicates with the gateway 12 to carry out a control program updating process. FIG. 4 shows a state in which a control program stored in the first area 1123 is currently running, version information on the control code D 11 is "101", and version information on the control data D 12 is "11". In the second area 1124, a control program older than the currently running control program by one version (the control code D 21 of version "100" and the control data D 22 of version "01") is stored. The version information is stored in a nonvolatile area of the vehicle controller 11, as the control code and control data are. An area storing the currently running control program is referred to as an "active surface", while an area storing a control program not running currently is referred to as a "non-active surface". In the state shown in FIG. 4, the first area is the "active surface", and the second area is the "non-active surface". When program updating is carried out, the "non-active surface" is a target area subjected to a control program updating process.

Figure 5:
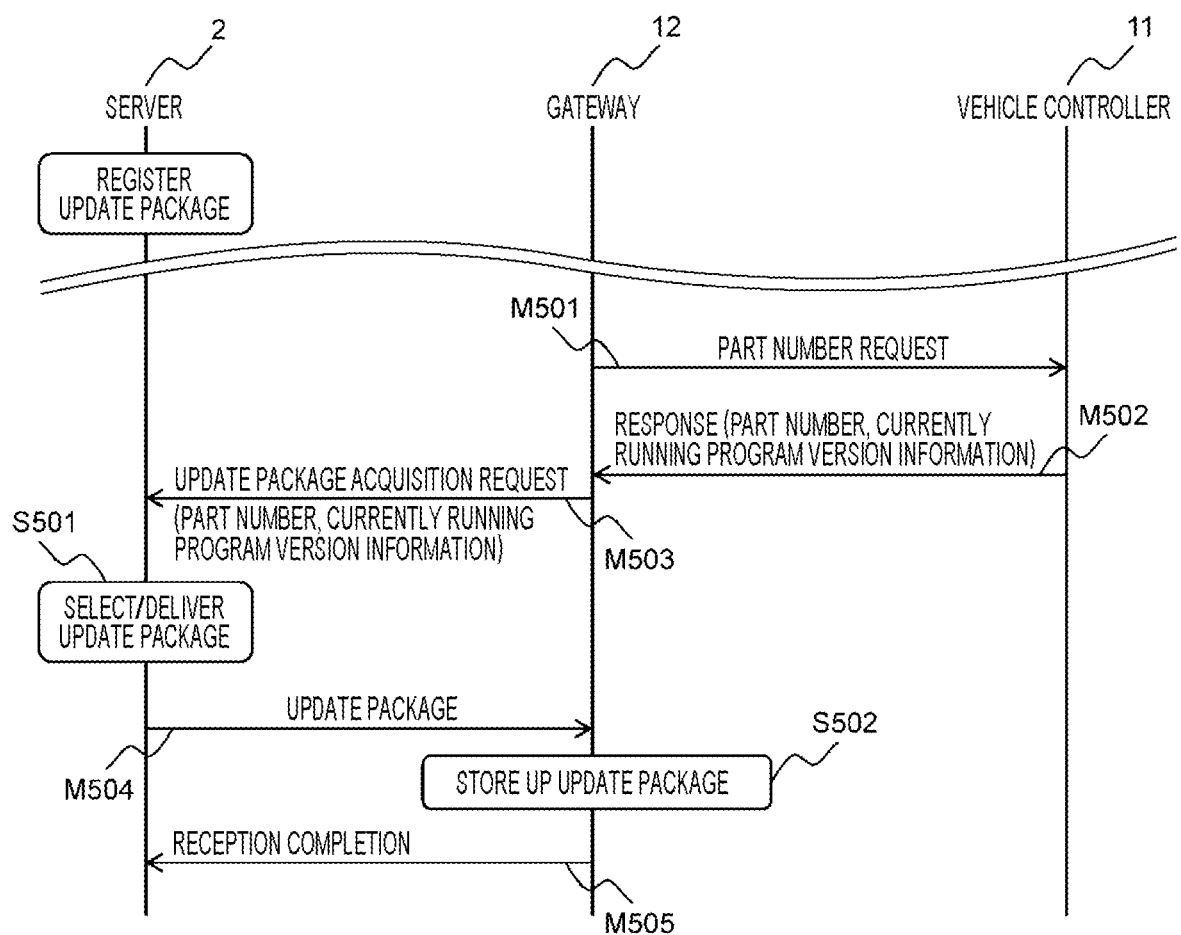
FIG. 5 is a sequence example showing a procedure for downloading an update package from a server to a gateway.

FIG. 5 is a sequence example showing a procedure for downloading the update package 5 from the server 2 onto the gateway 12.

When a control program of the vehicle controller 11 is corrected or a function is added to the program, the update package 5 is registered with the server 2 as a preparation step for software updating.

At a point of time at which the ignition of the vehicle is turned on, the gateway 12 transmits a request message requesting the part number of a currently running control program, to the vehicle controller 11 (M501). In response to the request, the vehicle controller 11 transmits the part number of the vehicle controller 11 and version information on the currently running program (M502). The part number is the number for uniquely identifying the vehicle controller 11. The version information on the currently running program includes information of the current active area and versions of both control code and control data stored in the active area.

Subsequently, the gateway 12 transmits an update package acquisition request message to the server 2 (M503). The update package acquisition request message M503 includes the part number of the vehicle controller 11 and the version information on the currently running control program. At step S501, based on the part number and the currently running program version information that are included in the update data acquisition request message, the server 2 selects a corresponding update package from registered update packages 5, and delivers the selected package to the target vehicle (M504). The update package 5 to be delivered includes information that specifies an area to which the update package 5 is written (first area, second area).

The gateway 12 stores up delivered update packages 5 (S502), at which the downloading is completed. Having stored up all the incoming data, the gateway 12 transmits a completion message to the server 2 (M505). The gateway 12 then executes software updating, based on the received update package 5. A configuration of the update package 5 and of the message will be described later.

Figure 6:
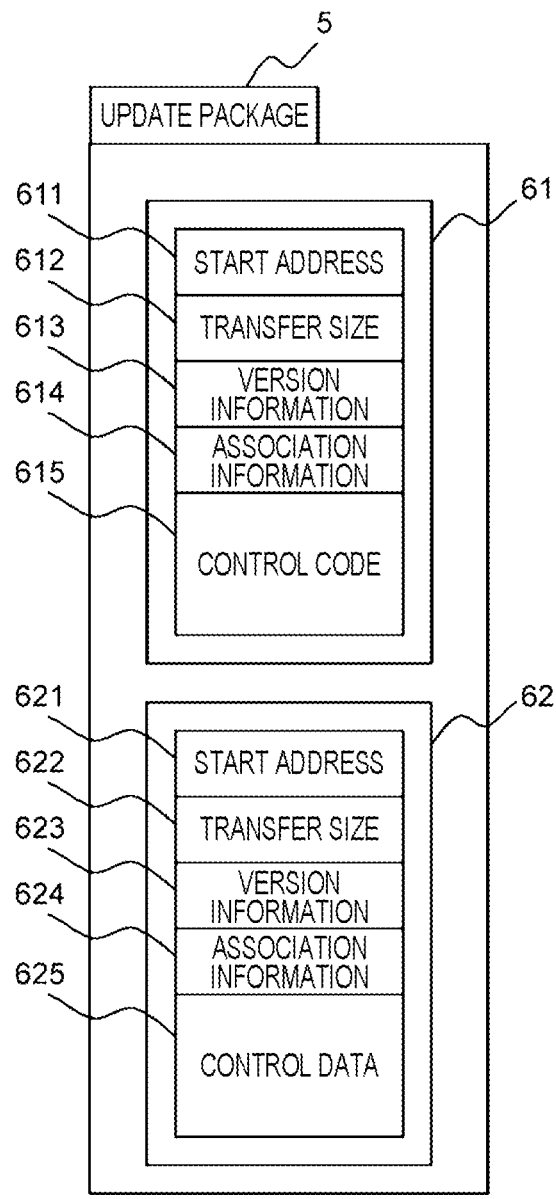
FIG. 6 depicts a configuration example of an update package that the gateway acquires from the server.

FIG. 6 depicts a configuration example of the update package 5 that the gateway 12 acquires from the server 2. The update package 5 includes a control code file 61 and a control data file 62.

The control code file 61 includes a start address 611, a transfer size 612, version information 613, association information 614, and a control code 615. The start address 611 is information indicating a start address in the flash ROM 112 of the vehicle controller 11, the start address being an address to which control data is written at the time of control program updating. The transfer size 612 is information of the volume (number of bytes) of the control code. The version information 613 is version information on the attached control code 615. The association information 614 is information associating the control code 615 with the control data 625, and is, specifically, described in the form of version information on the control code 615 and the control data 625. The association information 614 takes various forms, being provided as information associating the control code 615 with the control data 625 in one-to-one correspondence, or information associating the control code 615 with the control data 625 in one-to-many or many-to-one correspondence.

For example, version information on control data that can be used for a certain version of a control code is stored as association information. In this way, this control data cannot be used in a wrong pair of control data and a control code. A configuration of the control data file 62 is the same as that of the control code file 61 and is therefore omitted in further description.

Figure 7:
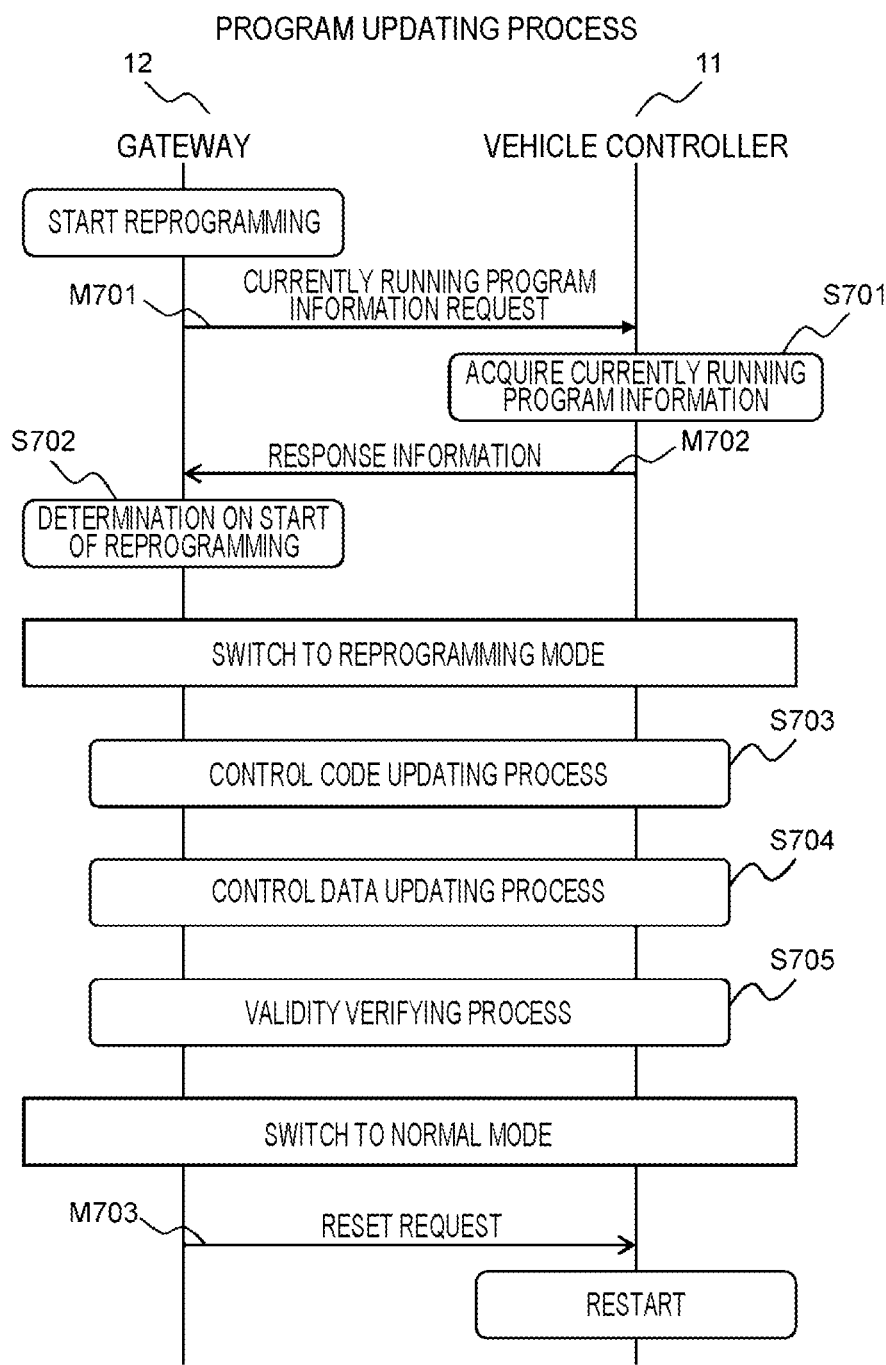
FIG. 7 is a sequence chart showing an example of a procedure by which the vehicle controller updates a control program.

FIG. 7 is a sequence chart showing an example of a procedure by which the vehicle controller 11 updates a control program. An updating sequence according to the first embodiment will hereinafter be described with reference to FIGS. 7 to 9.

When storing up delivered update packages 5 (S502) is completed, control program updating starts. Specifically, the gateway 12 activates the updating control unit 1221, and requests the vehicle controller 11 to transmit information on a currently running control program (M701). At step S701, the vehicle controller 11 executes a process of acquiring information on the currently running control program, and transmits the acquired information as a response (M702). The information acquired at step S701 includes, for example, an ECU ID, version information on the control code of the currently running control program, version information on the control data of the same, or the like.

The gateway 12 determines whether the response information (M702) received at step S702 has no error, and when determining that the response information has no error, causes the vehicle controller 11 to switch from normal mode to reprogramming mode, and starts a control program updating process.

At this point, for example, the gateway 12 may work in cooperation with the HMI 14, requesting the HMI 14 to display the ECU ID and version information on the control program, which have been received from the vehicle controller 11, or version information on an updated control program retained by the gateway 12, or confirming the user's decision on whether or not to start the control program updating process.

The program updating process is carried out by executing a control code updating process (S703), a control data updating process (S704), and a validity verifying process (S705) in this order. A detailed sequence of each of these processes will be described with reference to FIGS. 8 and 9. When completing the validity verifying process S705, the gateway 12 ends the reprogramming mode and switches to the normal mode, and transmits a reset request (M703) to the vehicle controller 11. The vehicle controller 11 restarts according to the reset request. As a result, the latest version of the control program is applied.

Figure 8:
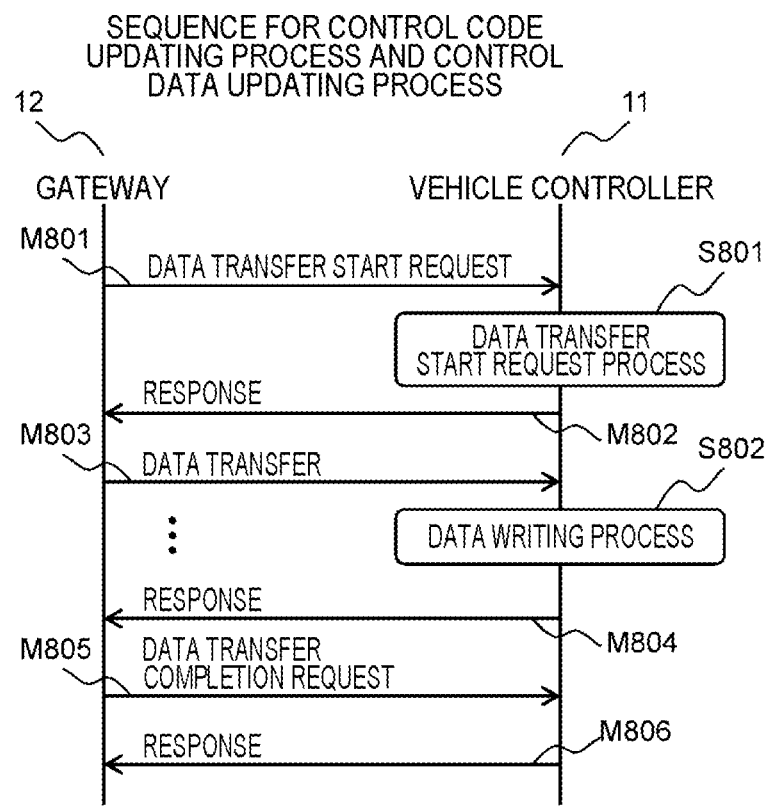
FIG. 8 is a detailed sequence chart of a control code updating process (S703) and a control data updating process (S704).

A detailed sequence of the control code updating process (S703) and the control data updating process (S704) will then be described with reference to FIG. 8. These updating processes executed at step S703 and step S704 are processes executed in the same sequence. For this reason, the control code updating process will be described here as an example.

The updating control unit 1221 of the gateway 12 transmits a control code data transfer start request (M801) to the vehicle controller 11. The data transfer start request includes information on a writing destination address indicating a writing destination of control code and on the size of data to be transmitted. At step S801, the updating processing unit 1122 of the vehicle controller 11 executes the data transfer start request process. Based on the received data, the updating processing unit 1122 determines whether update data the gateway 12 intends to transmit is a control code or control data. The updating processing unit 1122 then transmits an acceptance response (M802) to the gateway 12. This acceptance response includes information on the size of data that the vehicle controller 11 can receive at a time.

Subsequently, the updating control unit 1221 of the gateway 12 divides control code data, which is downloaded from the server 2 and is stored up at S502, into pieces of data of sizes that the vehicle controller 11 can receive at a time, and transmits the divided data as a data transfer message (M803), to the vehicle controller 11. Upon receiving the data transfer message (M803), the updating processing unit 1122 of the vehicle controller 11 executes a data writing process at step S802. At execution of the data writing process (S802), the updating request determining function 11221 first determines whether or not to update the control code, and then the updating processing unit 1122 executes the process, based on the result of the determination. Details of this determination process will be described later. The gateway 12 and the vehicle controller 11 execute the data writing process (S802) until transfer of the entire update data is completed. When transfer of the entire update data is completed, the vehicle controller 11 transmits a completion response (M804) to the gateway 12.

Thereafter, the gateway 12 sends a data transfer completion request (M805) to the vehicle controller 11. The vehicle controller 11 transmits an acceptance response (M806) to the gateway 12. Hence, the control code updating process (S703) is completed.

When the control code updating process (S703) is completed, the control data updating process is executed successively at step S704. A sequence procedure for the control data updating process is the same as the sequence procedure for the control code updating process (S703) described above. The control data updating process, together with the control code updating process, will be described in detail later.

A detailed sequence of the validity verifying process (S705) will be described with reference to FIG. 9.

The gateway 12 transmits a validity verifying request message (M811) to the vehicle controller 11 so that the vehicle controller 11 verifies the validity of written data. Upon receiving the validity verifying request message (M811), the updating processing unit 1122 of the vehicle controller 11 verifies the validity of the control program written by the data writing process (S802), at step S803 (S803). Based on an area where data is updated by the data writing process (S802), this verifying process verifies whether the updated control program data written to the updating destination area has no error. Details of the verifying process will be described later. The vehicle controller 11 transmits, as a response, the result of the verification to the gateway 12 (M812). The verification is carried out by error detection or error correction using a checksum, a cyclic redundancy check (CRC), a hash value, or the like.

Figure 10:
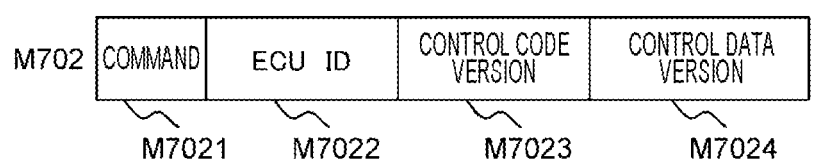
FIG. 10 depicts a configuration example of a message (M 702) transmitted from the vehicle controller to the gateway.

FIG. 10 depicts a configuration example of the response message (M702) that the vehicle controller 11 transmits upon receiving the currently running program information request message (M701) from the gateway 12 in the control program updating sequence (FIG. 7). The response message M702 includes a command M7021, an ECU ID M7022 of the vehicle controller 11, version information M7023 on the control code, and version information M7024 on the control data.

Figure 9:
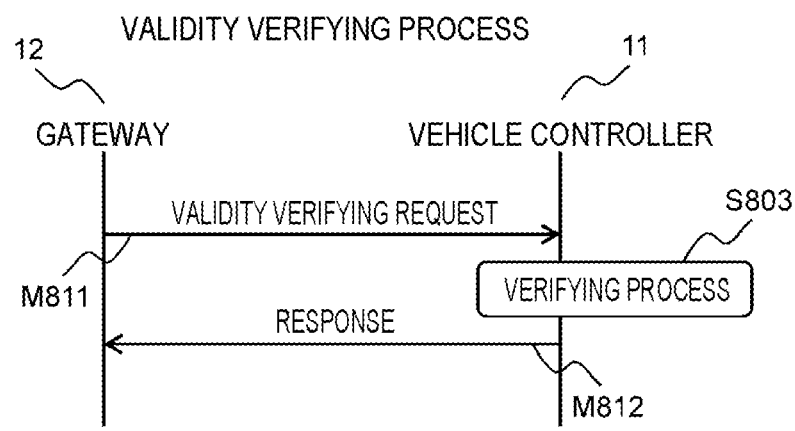
FIG. 9 is a detailed sequence chart of a validity verifying process (S 705).
Figure 11:
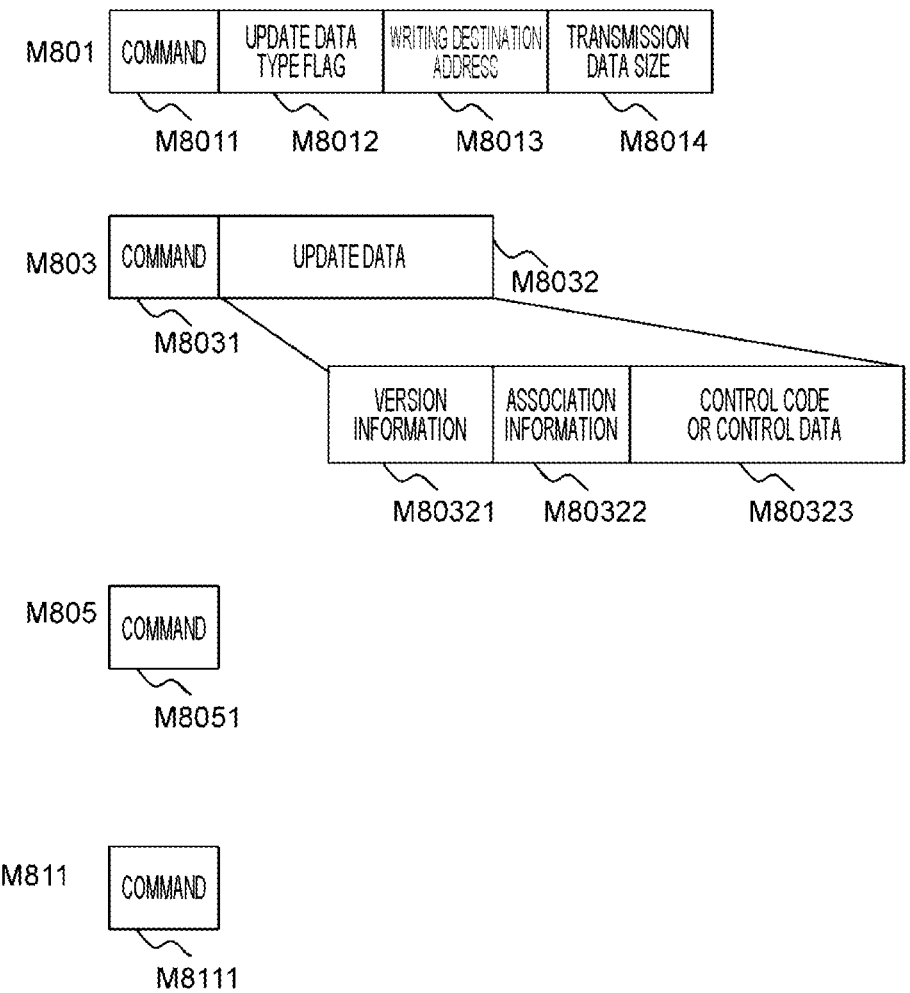
FIG. 11 depicts a configuration example of a communication message transmitted from the gateway to the vehicle controller.

FIG. 11 depicts a configuration example of a communication message that is transmitted from the gateway 12 to the vehicle controller 11 in the process of updating the control code and the control data (FIG. 8) and in the validity verifying process (FIG. 9).

The data transfer start request (M801) includes a command M8011, an update data type flag M8012, a writing destination address M8013, and a transmission data size M8014.

The data transfer message (M803) is a message for transferring update data M8032 to the vehicle controller 11. The update data M8032 included in the data transfer message (M803) includes version information M80321 on the update data, association information M80322, and a control code or control data M80323 that is the update data itself. The association information is information that associates the control code with the control data.

The data transfer completion request (M805) is a command indicating the end of transfer of the update data.

The validity verifying request (M811) is a command that requests verifying whether data of the updated control program written to the updating destination area has no error.

By the above-described updating sequence, the control program of the first embodiment is updated. A process that the vehicle controller 11 executes in its control program updating process will then be described with reference to FIGS. 12 to 15.

Figure 12:
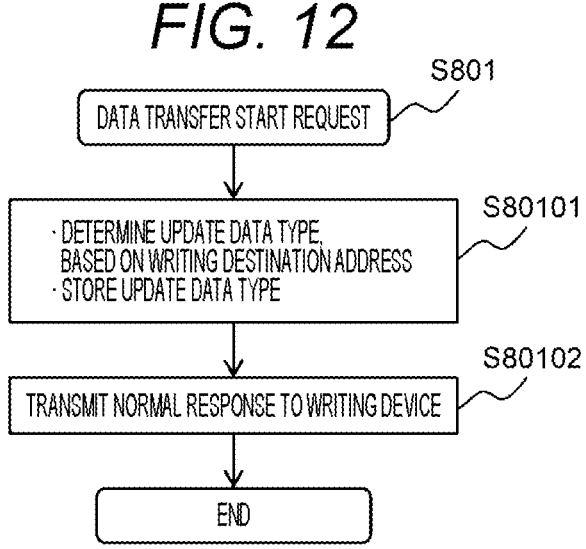
FIG. 12 is a detailed flowchart of a data transfer start request process (S801).

FIG. 12 is a detailed flowchart of the data transfer start request process (S801). Steps shown in FIG. 12 will hereinafter be described.

(FIG. 12: Step S801)

When receiving the data transfer start request M801 from the gateway 12, the arithmetic processing unit 111 of the vehicle controller 11 starts the process shown in FIG. 12.

(FIG. 12: Step S80101)

Based on the writing destination address M8013 included in the received data transfer start request M801, the arithmetic processing unit 111 determines whether update data transmitted from the gateway 12 is a control code or control data, and saves the result of the determination as an update data type. The arithmetic processing unit 111, which determines the update data type on the basis of the writing destination address, may adopt another means by which an update data type flag is acquired from the gateway 12. The arithmetic processing unit 111 may determine whether the update data is the control code or control data, using the update data type flag M8012 of the data transfer start request M801.

(FIG. 12: Step S80102)

Subsequently, the arithmetic processing unit 111 transmits an acceptance response to the gateway 12, and ends the whole process.

Figure 13:
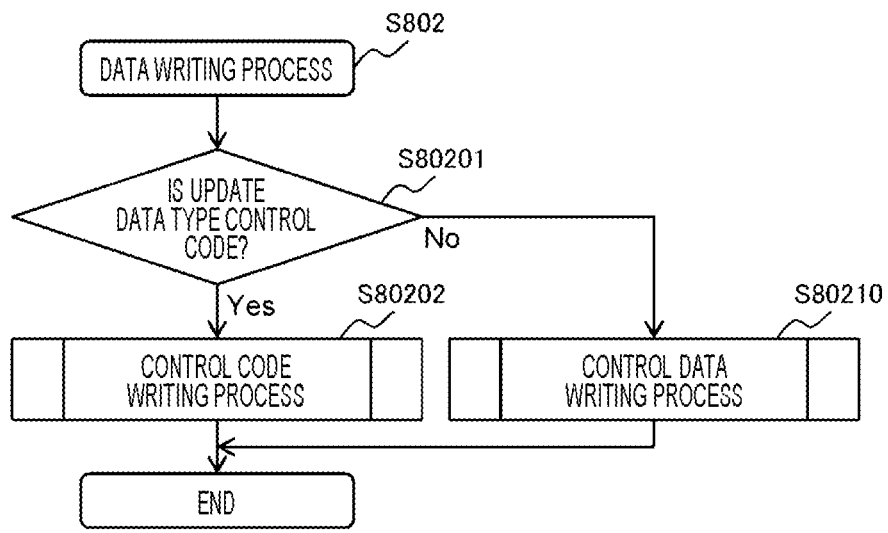
FIG. 13 is a detailed flowchart of a data writing process (S 802).

FIG. 13 is a detailed flowchart of the data writing process (S802). Steps shown in FIG. 13 will hereinafter be described.

(FIG. 13: Step S802)

When receiving the data transfer request M803 from the gateway 12, the arithmetic processing unit 111 of the vehicle controller 11 starts the process shown in FIG. 13.

(FIG. 13: Steps S80201, S80202, and S80210)

The arithmetic processing unit 111 determines whether the update data type determined at S80101 is the control code (S80201). When the update data type is the control code, the control code is written in at step S80202. When the update data type is the control data, on the other hand, the control data is written in at step S80210.

Figure 14:
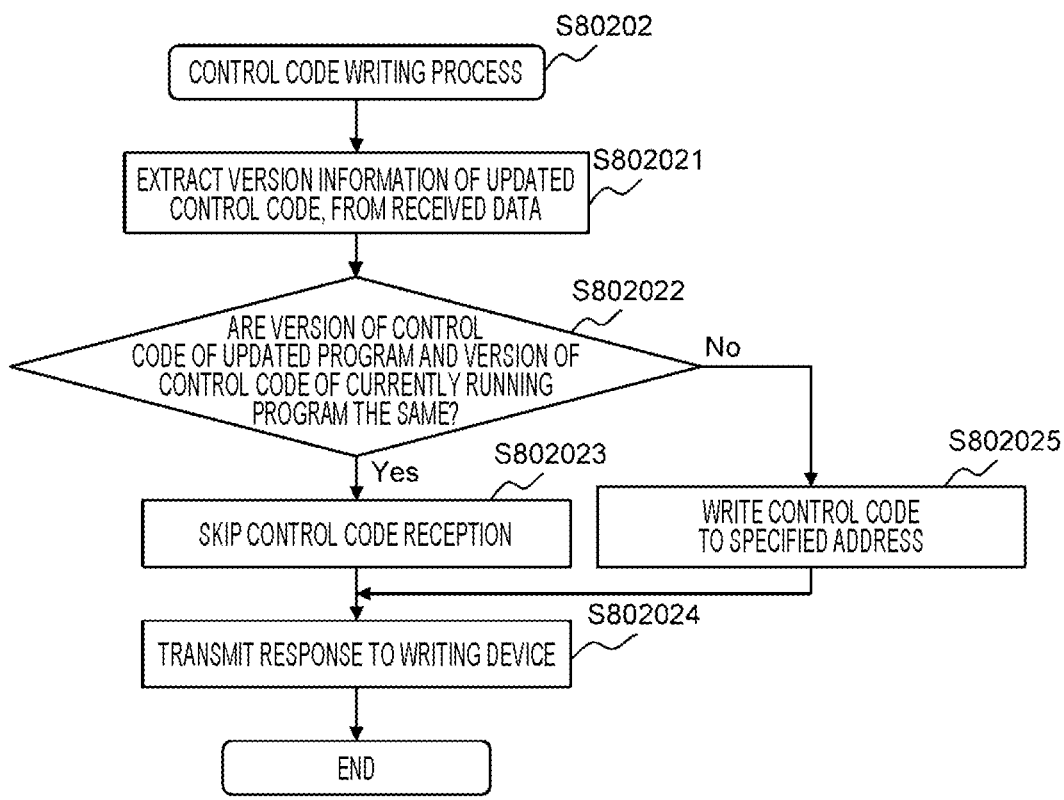
FIG. 14 is a detailed flowchart of a control code writing process (S80202).

FIG. 14 is a detailed flowchart of a control code writing process (S80202). This process is executed when the control code data transfer request M803 from the gateway 12 is received. Step shown in FIG. 14 will hereinafter be described.

(FIG. 14: Step S802021)

In execution of the control code writing process at step S80202, the arithmetic processing unit 111 first extracts the version information M80321 on the control code included in the update data M8032 received at step S802021.

(FIG. 14: Steps S802022 to S802024)

Subsequently, at step S802022, the arithmetic processing unit 111 compares a version of the control code of an updated program, the version being extracted at the step described above, with a version of the control code of a currently running program to determine whether both versions are the same. When it is found, as a result of the comparison, that the version of the control code of the updated program and the version of the control code of the currently running program are the same, further reception of control code data is skipped and therefore no control code data is updated any more (S802023). A message informing that the control code updating process will be skipped is then sent to the gateway 12 (S802024).

(FIG. 14: Step S802025)

When it is found, as a result of the comparison at step S802022, that the version of the control code of the updated program and the version of the control code of the currently running program are different from each other, control code data reception is continued, and data writing to the flash ROM 112 is executed repeatedly such that data of a size equivalent to the transmission data size M8014 is written to the writing destination address (M8013) included in the data transfer start request M801 (S802025).

This process allows the vehicle controller 11 to skip the control code updating process when the version of the update data is the same as the version of the control code of the currently active control program.

Figure 15:
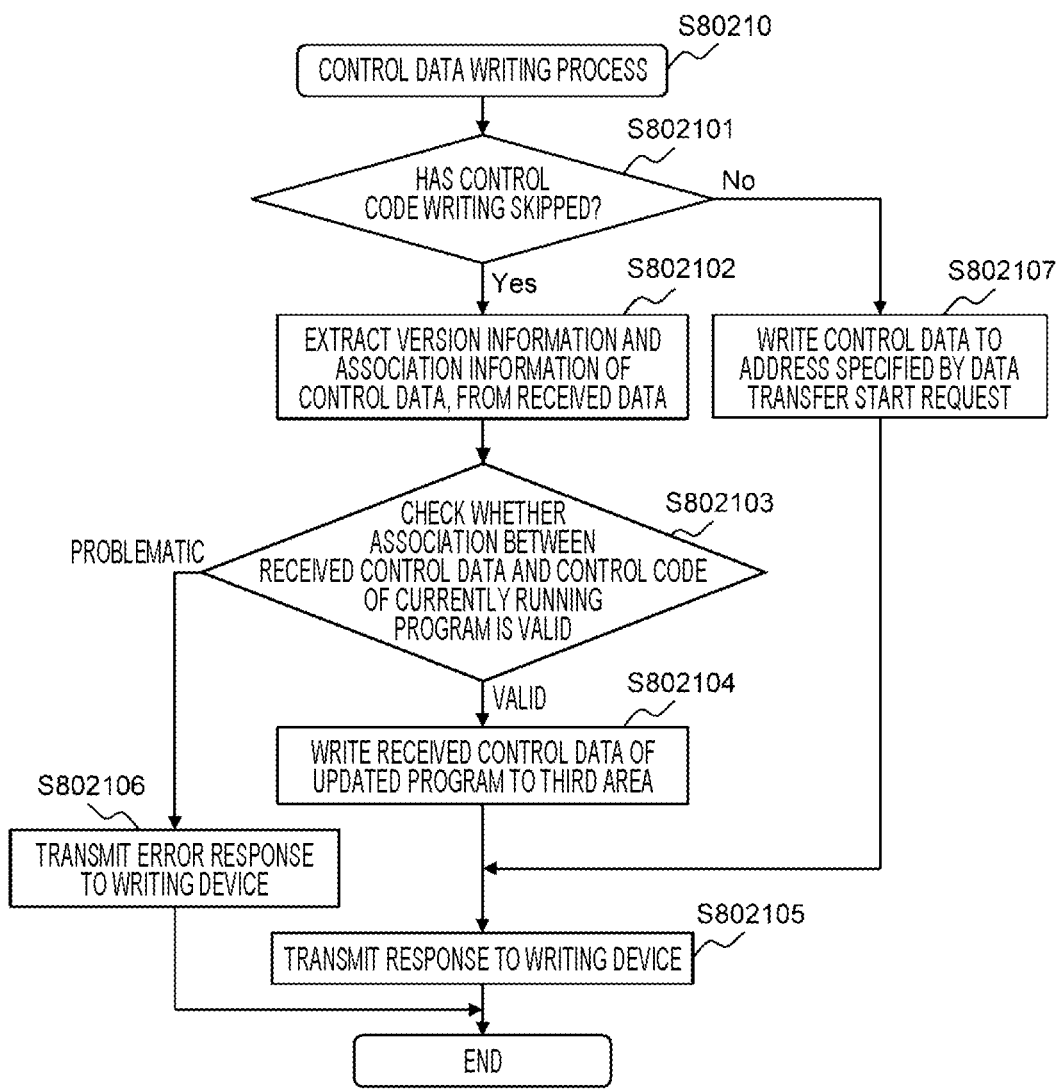
FIG. 15 is a detailed flowchart of a control data writing process (S80210).

FIG. 15 is a detailed flowchart of the control data writing process (S80210). This process is executed when the data transfer request M803 for transferring control data is received from the gateway 12. Steps shown in FIG. 15 will hereinafter be described.

(FIG. 15: Step S802101)

In execution of the control data writing process at step S80210, the arithmetic processing unit 111 first determines at step S802101 whether the control code updating process at step S703 is skipped.

(FIG. 15: Steps S802102 to S802106)

When the control code updating process is skipped, the version information M80321 and association information M80322 of the control data, which are included in the update data M8032 received from the gateway 12, are extracted at step S802102, and whether an association relationship between the currently active control program of the vehicle controller 11 and the received control data is valid is determined at step S802103. As described above, the association information is the information that associates the control code with the control data. In this case, as pre-processing for writing the received control data to the active area of the flash ROM 112 of the vehicle controller 11, whether a relationship between a version of a control code currently written to the active area and a version of the received control data is valid is determined. When it is determined that the relationship between these versions is valid, the received control data is written to the third area at step S802104, and, after completion of the writing to the third area, a completion response is transmitted to the gateway 12 (S802105). When it is determined at step S802103 that the relationship between the versions is not valid, an error message is sent to the gateway 12 as a response (S802106).

(FIG. 15: Step S802107)

When it is determined at step S802101 that the control code updating process at step S703 is executed, the arithmetic processing unit 111 of the vehicle controller 11 writes the received control data to the non-active surface of the flash ROM 112 such that data of a size equivalent to the transmission data size M8014 is written to the writing destination address (M8013) included in the data transfer start request M801. The writing process is executed until transfer of the entire update data is completed.

According to this process, the vehicle controller 11 can temporarily write the control data to the third area 1125 when the version of the update data is the same as the version of the control code of the currently active control program, and can write the control data to the non-active surface when the version of the update data is different from the version of the control code.

Figure 16:
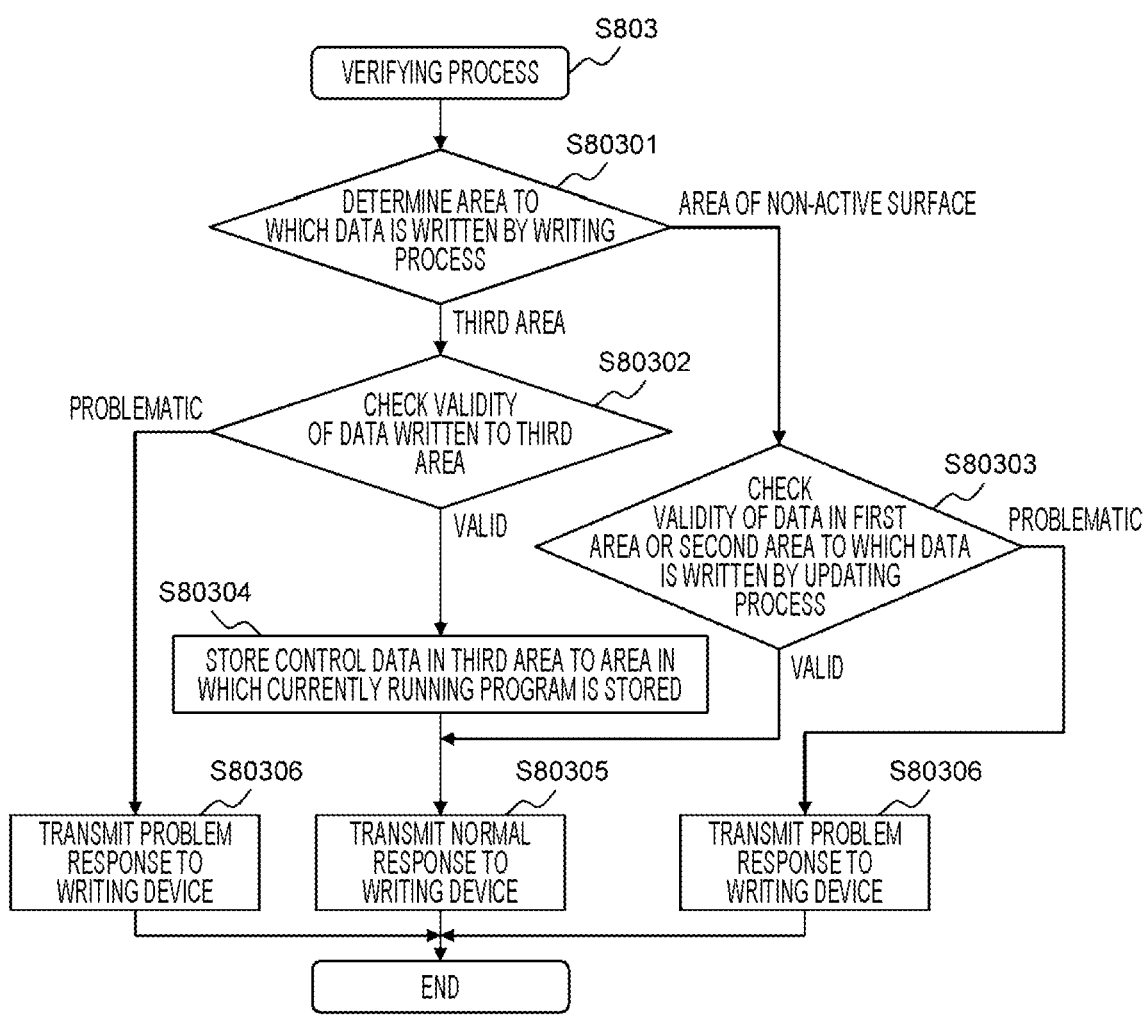
FIG. 16 is a detailed flowchart of the validity verifying process (S803).

FIG. 16 is a detailed flowchart of the validity verification process (S803). Steps shown in FIG. 16 will hereinafter be described.

(FIG. 16: Step S803)

When receiving the validity verifying request M811 from the gateway 12, the arithmetic processing unit 111 of the vehicle controller 11 starts the process shown in FIG. 16.

(FIG. 16: Step S80301)

First, at step S80301, the arithmetic processing unit 111 determines an area to which the updated control program is written by the data writing process at S802.

(FIG. 16: Steps S80302 and S80303)

When the control data has been written to the third area 1125, the validity of the data written to the third area 1125 is checked at step S80302. When the control data has been written to the area of the non-active surface, the validity of both control code and control data in that area (the first area 1123 or the second area 1124) is checked at step S80303.

(FIG. 16: Steps S80304 to S80306)

When checking the validity of the data written to the third area (S80302) gives a valid result, the arithmetic processing unit 111, at step S80304, copies the control data stored in the third area 1125 to the control data storage area on the active surface of the flash ROM 112. When the copying is completed, a completion response is transmitted to the gateway 12 (S80305). When checking the validity of the data written to the third area (S80302) gives a problematic result, on the other hand, a problem response is transmitted to the gateway 12 (S80306).

(FIG. 16: Step S80307)

When checking the validity of the update data stored in the non-active surface (S80303) gives a valid result, a completion response is transmitted to the gateway 12 (S80305). When it gives a problematic result, a problem response is transmitted to the gateway 12 (S80306).

It should be noted that timing of executing the process of step S80304 does not always have to be the timing described above. The process may be executed in a safe situation in which, for example, the ignition is turned off, the vehicle is stopped, or the vehicle controller 11 is not operating, providing that the validity of the data is confirmed.

First Embodiment: Summary

As described above, the vehicle controller 11 according to the first embodiment has the first area 1123 and the second area 1124 in the flash ROM 112, and executes a program updating method of a two-surface ROM configuration by which control program updating is carried out alternately. If the version of the control code of the updated control program is the same as the version of the control program stored in the active surface of the vehicle controller 11, the vehicle controller 11 updates only the control data and write it to the area of the active surface (while not updating the control code). As a result, the control program updating time can be reduced. In addition, when updating only the control data, the vehicle controller 11 does not overwrite the control data directly, but writes data received from the gateway 12 to the third area 1125 temporarily, checks the validity of the contents of the received data, and then stores the data in the storage area of the active surface. By this process, the vehicle controller 11 is able to safely update the control data.

Second Embodiment

In the first embodiment, the configuration in which the vehicle controller 11 has the updating request determining function 11221 and receives data from the gateway to update only the control data has been described. However, if the gateway 12 has the updating request determining function, it does not need to transmit an updating request unless control code updating is necessary. An example of a means according to the second embodiment will hereinafter be described.

Figure 17:
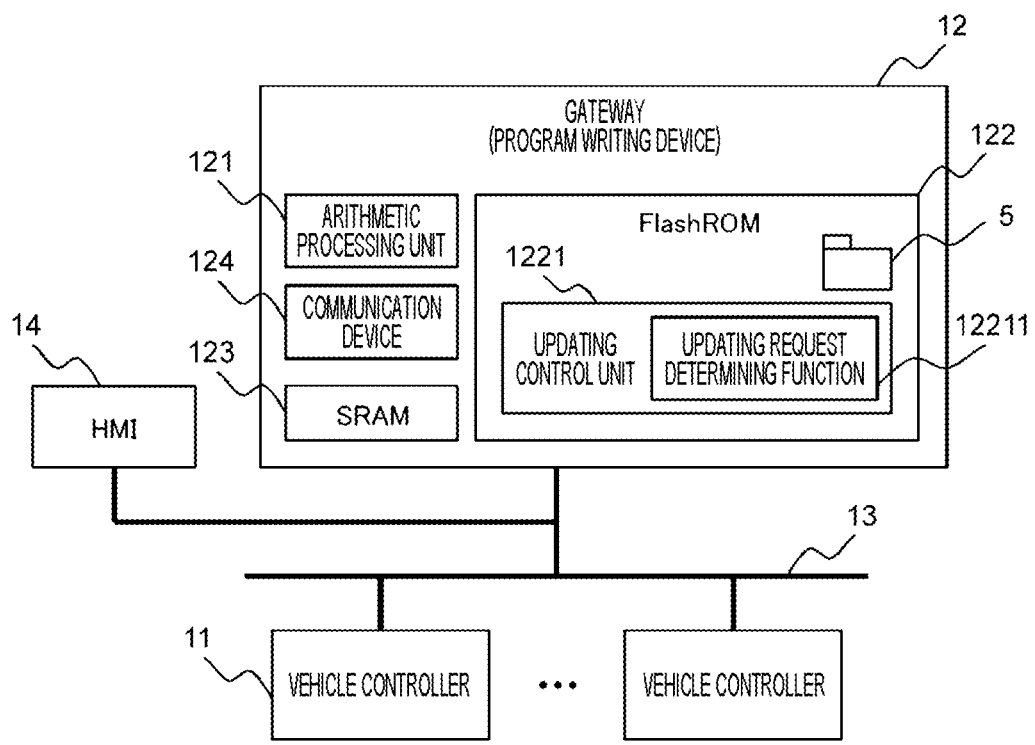
FIG. 17 is a configuration diagram of a gateway according to a second embodiment.

FIG. 17 is a configuration diagram of the gateway 12 according to the second embodiment of the present invention.

According to the second embodiment, the updating control unit 1221 of the flash ROM 112 has the updating request determining function 12211. In the second embodiment, the gateway 12 determines whether to update only the control data of the vehicle controller 11 or to update both control code and control data, using the updating request determining function 12211. With this configuration aspect put aside, other configuration aspects of the vehicle controller 11 of the second embodiment is the same as those of the vehicle controller 11 of the first embodiment. Description of those configuration aspects will therefore be omitted.

Figure 18:
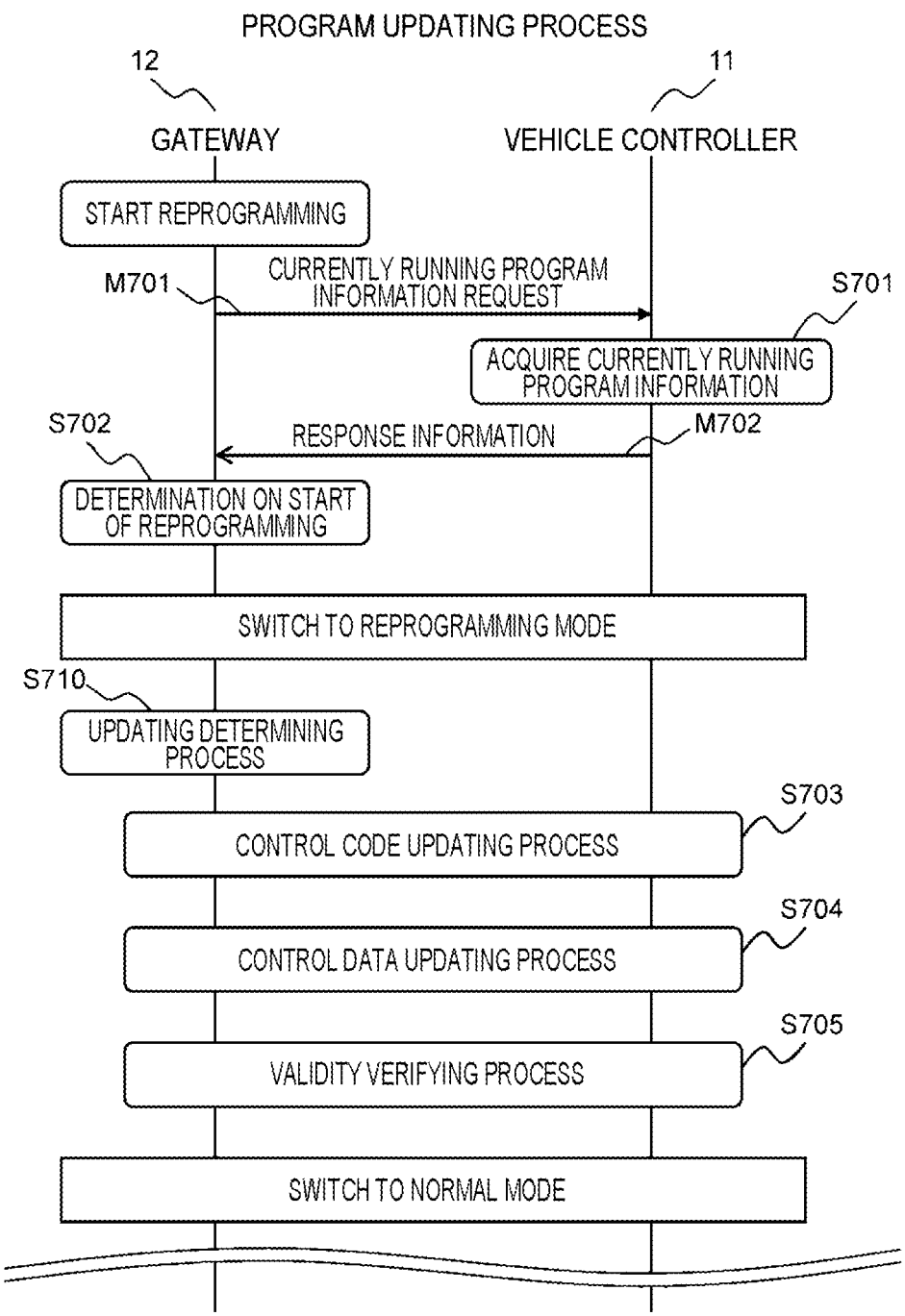
FIG. 18 is a sequence diagram showing an example of a procedure by which a vehicle controller according to the second embodiment updates a control program.

FIG. 18 is a sequence diagram showing an example of a procedure by which a vehicle controller according to the second embodiment of the present invention updates a control program. In the second embodiment, the updating request determining function 12211 of the gateway 12 determines at step S710 whether to update only the control data of the vehicle controller 11 or to update both control code and control data.

Figure 19:
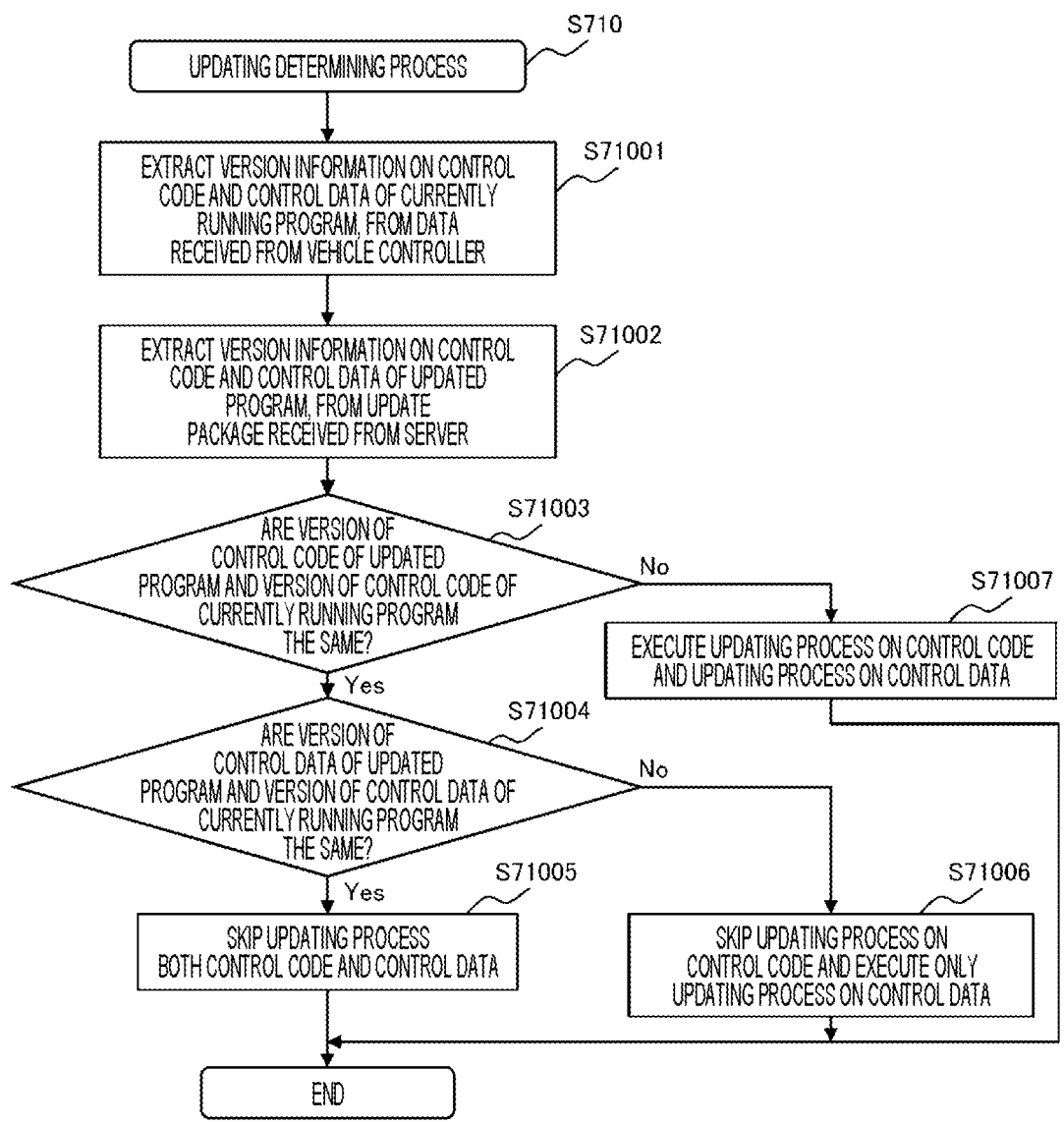
FIG. 19 is a detailed flowchart of an updating request determining process (S 710).

FIG. 19 is a detailed flowchart of the updating request determining process (S710). Steps shown in FIG. 19 will hereinafter be described.

(FIG. 19: Step S710)

The arithmetic processing unit 121 of the gateway 12 executes a process shown in FIG. 19 before reprogramming mode is started and update data is transmitted.

(FIG. 19: Step S71001)

First, at step S71001, the arithmetic processing unit 121 of the gateway 12 extracts the version information M7023 on the control code of a currently running control program and the version information M7024 on the control data of the program, from the response message M702 received from the vehicle controller 11.

(FIG. 19: Step S71002)

Subsequently, at step S71002, the arithmetic processing unit 121 extracts the version information 613 on the control code of an updated control program and the version information 623 on the control data of the program, from the update package 5 received from the server 2.

(FIG. 19: Steps S71003 and S71007)

At step S71003, the arithmetic processing unit 121 determines whether the version of the control code of the updated program and the version of the control code of the currently running program are the same. When the versions of the control codes of both programs are different from each other, both control code and control data are updated at step S71007.

(FIG. 19: Steps S71004 to S71006)

When it is determined at step S71003 that the versions of the control codes of both programs are the same, on the other hand, whether the version of the control data of the updated program and the version of the control data of the currently running program are the same is additionally determined at step S71004. When the versions of the control codes of the updated program and the currently running program are the same, it means that the control codes and the control data are of the same version, in which case, therefore, neither an updating process on the control code nor an updating process on the control data is carried out (S71005). When the versions of the control data of the updated program and the currently running program are different from each other, it means that the control codes are of the same version while the control data are not. In this case, the updating process on the control code is skipped while the updating process on the control data is carried out (S71006).

Second Embodiment: Summary

As described above, when the version of the control code of the updated control program is the same as the version of the control code of the control program stored in the active surface of the vehicle controller 11, the gateway 12 according to the second embodiment performs control in such a way as to skip the updating process on the control code (S703) while carrying out the updating process on the control data. This allows the vehicle controller to dispense with the process of determining whether control code updating (S802022 and S802023 in FIG. 14) is necessary, thus reducing work load on the vehicle controller and reducing the updating time as well.

Modifications of the Present Invention

The present invention is not limited to the above-described embodiments, and includes various modifications and configurations equivalent thereto, which are within the scope of the appended claims. For example, the embodiments have been described exemplarily in detail above in order to facilitate understanding of the present invention. The present invention is, therefore, not necessarily limited to embodiments including all constituent elements described. Some constituent elements of a certain embodiment may be replaced with constituent elements of another embodiment. Further, a constituent element of another embodiment may be added to a constituent element of a certain embodiment. Furthermore, some constituent elements of each embodiment may be deleted, or add to or replaced with constituent elements of another embodiment.

In the first and second embodiments, the flash ROM 112 is exemplarily described as an area for storing a control program. A different non-volatile storage device, however, may be used in place of the flash ROM 112.

In the first and second embodiments, the configuration example in which the flash ROM 112 is divided into the first area 1123 and the second area 1124 has been described. The first area 1123 and the second area 1124, however, may be provided as two separate storage devices. In another case, three or more storage areas (or storage devices) may be provided to achieve a configuration similar to the configuration of the first embodiment. In this case, for example, the control program is stored in these storage areas (or storage devices) in order.

In an updating sequence, the latest version of the control program is usually written in. Nevertheless, circumstances may possibly require that program updating be carried out by using a downgraded version of the control program. In this case, this downgraded version of the control program is used as an updated version of the control program. In other words, the updated version of the control program is the control program that has been written in by the preceding updating sequence.

Some or all of the above-described constituent elements, functions, processing units, processing means, and the like may be provided in the form of hardware by packaging them in an integrated circuit, or in the form of software by causing a processor to interpret and execute programs that implement respective functions. In a case where a plurality of functions that are identical in configuration are present, pieces pf hardware or software that implement these functions, respectively, may be provided separately, or a single piece of hardware or software provided may be used in a time-division multiplexing manner to carry out a plurality of processes. A function that is considered to be a single function in terms of configuration may be implemented as distributed processing, using a plurality of pieces of hardware or software having the same function.

Information on programs, tables, files, and the like for implementing various functions may be stored in a storage device, such as a memory, a hard disk, and a solid state drive (SSD), or in a recording medium, such as an IC card, an SD card, and a DVD.

A group of control lines and data lines considered to be necessary for description are illustrated, and all control lines and information lines needed as mounted elements are not necessarily illustrated. It is safe to assume that, actually, almost the entire constituent elements are interconnected.

As described above, the vehicle controller according to present embodiment includes: the nonvolatile memory (flash ROM 112) that allows the first memory area (first area 1123) and the second memory area (second area 1124) to be switched and used alternately, the first memory area and the second memory area each having a plurality of blocks in which the control code 615 and the control data 625 are stored, respectively; and the updating request determining unit (updating request determining function 11221) that determines whether an updating request from the writing device (gateway 12) requests updating of both the control code 615 and the control data 625 or requests updating of the control data 625 only. When determining that updating of the control data 625 only is requested, the updating request determining unit 11221 writes the received control data 625 to a specified area (active surface) of the nonvolatile memory in which a currently active control program is stored. Because of this configuration, only the control data is updated on a necessary basis, and therefore the control program updating time can be reduced.

The nonvolatile memory 112 includes the third memory area (third area 1125) in which the control data 625 is temporarily stored. When determining that updating of the control data 625 only is requested, the updating request determining unit 11221 writes the received control data to the third memory area 1125, confirms that the control data 625 has been normally written to the third memory area 1125, and then writes the control data from the third memory area 1125 to the specified area (active surface) of the nonvolatile memory 112 in which the currently active control program is stored. Because of this process, the control data of the running program is not directly overwritten, and is therefore updated safely.

The control code 615 and the control data 625 each have the version information. The updating request determining unit 11221 compares the version information on the control code 615 received from the vehicle controller 11 with the version information on the control code 615 of the updated program, and determines an updating target. In addition, separate pieces of version information are set for the control code 615 and the control data 625, respectively. This configuration allows updating of the control data only, thus reducing the control program updating time.

The updating request determining unit 11221 compares the version information on the control code 615 of the currently active program with the version information on the control code 615 of the updated program, and updates only the control data 625 when the versions of both control codes 615 are the same, while updates both control code 615 and control data 625 when the versions of both control codes 615 are different from each other. In this manner, only the control data is updated on a necessary basis, and therefore the control program updating time can be reduced.

When updating the control data 625 only, the vehicle controller 11 checks the association between the control code 615 included in the currently active control program stored in the nonvolatile memory 112 and the control data 625 to be updated, and when the association is valid, writes the control data 625 to be updated to the nonvolatile memory 112. This process prevents malfunction caused by updating of the control data, thus allowing the control data to be updated safely.

The point of time of storing the control data 625 in the specified area (active surface) of the nonvolatile memory, in which the currently active control program is stored, is determined to be at least either the point of time of detecting the vehicle's ignition being turned off or the point of time of the vehicle's being stopped. As a result, the control data can be updated in a safe state.

At least the input/output device (HMI 14) that presents information to the user is provided, and at updating of the control program, the input/output device presents to the user at least either the version information on the control code or the version information on the control data. The control program, therefore, can be updated in response to the user's instruction, in which case erroneous updating can be prevented.

The writing device (gateway 12) of the present embodiments includes a means that acquires the version information of the control program from the vehicle controller 11, and the updating request determining unit (updating request determining function 12211) that determines whether updating the control program requires updating both control code 615 and control data 625 or requires updating the control data 625 only. When determining that updating the control data 625 only is required, the updating request determining unit 12211 stores the received control data 625 in the specified area (active surface) of the nonvolatile memory in which the currently active control program is stored. This configuration reduces work load on the vehicle controller and reduces the control program updating time as well.

REFERENCE SIGNS LIST

1 vehicle
2 server
3 Internet line
4 radio base station
5 update package
11 vehicle controller
111 arithmetic processing unit
112 flash ROM
1122 updating processing unit
1123 first area
1124 second area
1125 third area
12 gateway (program writing device)
13 in-vehicle network
14 HMI (Human Machine Interface)
D11 control code of the currently running program
D12 control data of the currently running program

The invention claimed is:

1. A vehicle controller that updates a stored control program, based on update contents provided by a writing device,
    wherein the control program includes a control code and control data that is referred to when the control code is executed, the vehicle controller comprises:
    a nonvolatile memory that allows a first memory area and a second memory area to be switched and used alternately, the first memory area and the second memory area each storing both the control code and the control data; and
    an updating request determining function that determines whether an updating request from the writing device requests updating of both the control code and the control data or requests updating of the control data only, and
    when determining that updating of the control data only is requested, the updating request determining function writes received control data to any given memory area in which a currently active control program associated with the control code of the given memory area is stored.

2. The vehicle controller according to claim 1, wherein the nonvolatile memory includes a third memory area in which the received control data is to be temporarily stored, and when determining that updating the control data only is requested, the updating request determining function writes the received control data to the third memory area, confirms that the received control data has been normally written to the third memory area, and then writes the received control data from the third memory area to a memory area in which a currently active control program associated with the control code of the memory area is stored.

3. The vehicle controller according to claim 1, wherein the control code and the control data each have version information, and the updating request determining function compares version information on a control code received from the vehicle controller with version information on a control code of an updated program, and determines an updating target.

4. The vehicle controller according to claim 3, wherein the updating request determining function compares the version information on the received control code of a currently active program of at least one memory area with the version information on the control code of the updated program, and updates only control data when versions of both control codes are identical, while updates both the received control code and the control data associated with the received control code when the versions of both the control codes are different from each other.

5. The vehicle controller according to claim 4, wherein in a case of updating control data only, the vehicle controller writes the control data of the updated program to the nonvolatile memory when an association between a control code included in a currently active control program stored in the nonvolatile memory and the control data of the updated program is valid.

6. The vehicle controller according to claim 1, wherein a point of time of storing the control data in the any given memory area is at least either a point of time of detecting a vehicle's ignition being turned off or a point of time of the vehicle's being stopped.

7. The vehicle controller according to claim 1, wherein at updating of the control program, the vehicle controller outputs at least either version information on the control code or version information on the control data to present the version information to a user.

8. A computer program product stored on and executed in a vehicle controller, the product comprising code stored thereupon, the code, when executed by a processor, causes the processor to update a stored control program, based on update contents provided by a writing device,
    wherein the control program includes a control code, and control data that is referred to when the control code is executed,
    the vehicle controller includes a nonvolatile memory that allows a first memory area and a second memory area to be switched and used alternately, the first memory area and the second memory area each storing both the control code and the control data, and
    the updated control program causes the vehicle controller to execute:
    a procedure of determining whether an updating request from the writing device requests updating of both the control code and the control data or requests updating of the control data only; and a procedure of writing received control data, when determining that updating the control data only is requested, to any given memory area in which a currently active control program associated with the control code of the given memory area is stored.

9. A program updating system that updates a control program for controlling a vehicle, the program updating system comprising:
 a vehicle controller incorporated in the vehicle, the vehicle controller updating a stored control program;
 a writing device incorporated in the vehicle, the writing device controlling updating of the control program; and
 an external device that delivers an update package to the writing device, the update package including difference data of the control program, wherein the control program includes a control code, and control data that is referred to when the control code is executed, the vehicle controller includes:
  a nonvolatile memory that allows a first memory area and a second memory area to be switched and used alternately, the first memory area and the second memory area each storing both the control code and the control data; and
  an updating request determining function that determines whether an updating request from the writing device requests updating of both the control code and the control data or requests updating of the control data only, and when determining that updating of the control data only is requested, the updating request determining function writes received control data to any given memory area in which a currently active control program associated with the control code of the given memory area is stored.

10. The program updating system according to claim 9, comprising an input/output device that at least presents information to a user,
 wherein at updating of the control program, the program updating system presents to the user at least either version information on the control code or version information on the control data.

11. A writing device that controls updating of a control program stored in a vehicle controller, wherein the control program includes a control code and control data that is referred to when the control code is executed, the writing device comprises:
 a hardware processor;
 a procedure that acquires version information on a control program from the vehicle controller; and
 an updating request determining function that determines whether updating of the control program requires updating both the control code and the control data or requires updating the control data only, and
 when determining that updating the control data only is required, the updating request determining function writes received control data to any given memory area in which a currently active control program associated with the control code of the given memory area is stored.

* * * * *